(12) United States Patent
Fairhurst et al.

(10) Patent No.: US 8,155,134 B2
(45) Date of Patent: Apr. 10, 2012

(54) SYSTEM-ON-CHIP COMMUNICATION MANAGER

(75) Inventors: Mark Fairhurst, Manchester (GB); John Dickey, Apex, NC (US)

(73) Assignee: Applied Micro Circuits Corporation, San Diego, CA (US)

( * ) Notice: Subject to any disclaimer, the term of this patent is extended or adjusted under 35 U.S.C. 154(b) by 1078 days.

(21) Appl. No.: 11/904,814

(22) Filed: Sep. 29, 2007

(65) Prior Publication Data

US 2009/0086737 A1 Apr. 2, 2009

(51) Int. Cl.
*H04L 12/28* (2006.01)

(52) U.S. Cl. ........ 370/413; 370/412; 370/394; 370/235; 370/236; 370/249; 370/360

(58) Field of Classification Search .......... 370/413, 370/394, 412, 229, 235, 236, 249, 360
See application file for complete search history.

(56) References Cited

U.S. PATENT DOCUMENTS

| | | | | |
|---|---|---|---|---|
| 6,141,323 A * | 10/2000 | Rusu et al. | | 370/236 |
| 6,745,277 B1 * | 6/2004 | Lee et al. | | 711/5 |
| 6,892,199 B2 * | 5/2005 | Hong et al. | | 1/1 |
| 7,756,131 B2 * | 7/2010 | Lee et al. | | 370/392 |
| 2006/0271823 A1 * | 11/2006 | Smith | | 714/37 |
| 2007/0174529 A1 * | 7/2007 | Rodriguez et al. | | 710/240 |

* cited by examiner

*Primary Examiner* — Kibrom T Hailu

(74) *Attorney, Agent, or Firm* — Law Office of Gerald Maliszewski; Gerald Maliszewski

(57) ABSTRACT

A Queue Manager (QM) system and method are provided for communicating control messages between processors. The method accepts control messages from a source processor addressed to a destination processor. The control messages are loaded in a first-in first-out (FIFO) queue associated with the destination processor. Then, the method serially supplies loaded control messages to the destination processor from the queue. The messages may be accepted from a plurality of source processors addressed to the same destination processor. The control messages are added to the queue in the order in which they are received. In one aspect, a plurality of parallel FIFO queues may be established that are associated with the same destination processor. Then, the method differentiates the control messages into the parallel FIFO queues and supplies control messages from the parallel FIFO queues in an order responsive to criteria such as queue ranking, weighting, or shaping.

20 Claims, 8 Drawing Sheets

SYSTEM-ON-CHIP COMMUNICATION MANAGER

BACKGROUND OF THE INVENTION

1. Field of the Invention

This invention generally relates to digital processing devices and, more particularly, to a system and method for managing communications between processors.

2. Description of the Related Art

FIG. 1 is a schematic diagram depicting a processor employing buffer descriptor rings (prior art). Conventionally, communication between masters (e.g. processors and coprocessors) within a general purpose processor is enabled through the use of buffer descriptor rings. Shown is a processor with regular expressions (reg ex), security, and Ethernet buffer descriptor (BD) rings. A separate ring structure is provided for each to enable a one-to-one communication path within the system-on-chip (SoC). Each ring has a set of buffer descriptors and control mechanisms dedicated to the communication path between one producer (source processor) and one consumer (destination processor). Extensive software overhead is required to manage this communication. The additional requirement of multiple sources supporting differentiated flows accessing common coprocessors significantly complicates this communication, which can have a substantial impact on processor performance.

FIG. 2 is a diagram depicting a fixed link communication path with an Ethernet coprocessor (prior art). As an alternative to buffer descriptor rings, communication between processors and coprocessors within a network processor may utilize fixed links between different processing stages. This approach is targeted for high performance communication between stages within a fixed processing flow. However, fixed links are inflexible to new requirements and new flows. Congestion awareness is limited to next hop availability only (blocking).

Both of the above-references processor communication mechanisms are ill suited to next generation processor devices where increased throughput requires multiple processors and an increasing use of coprocessors for functions such as security. The use of multiple processors increases the complexity and the size of the communication load within a SoC.

Neither do conventional processor communications enable strict communication channels between specific producers and consumers, as control and data do not follow fixed pre-defined paths through the device. Flexibility is required as multiple processors communicate with each other and to/from common coprocessors. Further, differentiated paths within communication links are essential to meet the requirements of emerging multi-play services.

It would be advantageous if a processor communications system could provide hardware acceleration for communication within a SoC and between SoCs based upon a message passing paradigm. This message passing paradigm would enable an efficient, flexible, high performance communication infrastructure with built-in support for differentiated services, such as multi-play.

SUMMARY OF THE INVENTION

The instant disclosure describes a communication engine enabling an inter and intra SoC message passing architecture for next generation processors, supporting flexible, high performance communication channels with built-in Quality of Service (QoS) differentiation. To meet the increased bandwidth and processing demands, next generation processor SoCs must support multiple processor cores and utilize more hardware accelerators (coprocessors) than previous generations. These advancements increase the communications load within the SoC, both in complexity and throughput. In addition, processors are required to provide differentiation in communication and work load selection to support emerging multi-play services. This ability to differentiate requires resources to be applied to critical services during times of congestion.

The disclosure describes a centralized communication engine designed to offload and accelerate inter and intra SoC communication. The flexible assignment of links and prioritized communication channels within links between processors and coprocessors is provided to support differentiated flows through the SoC. Messages can be relayed through these links with minimal processor involvement, allowing the processor to focus on non-communication related tasks.

Accordingly, a method is provided for communicating control messages between processors. The method accepts control messages from a source processor addressed to a destination processor. The control messages are loaded in a first-in first-out (FIFO) queue associated with the destination processor. Then, the method serially supplies loaded control messages to the destination processor from the queue.

The messages may be accepted from a plurality of source processors addressed to the same destination processor. The control messages are added to the queue in the order in which they are received. In one aspect, a plurality of parallel FIFO queues may be established that are associated with the same destination processor. Then, the method differentiates the control messages into the parallel FIFO queues and supplies control messages from the parallel FIFO queues in an order responsive to criteria such as queue ranking, weighting, or shaping. Alternately, queue selection instructions may be received from the destination processor, and control messages are supplied from a selected FIFO queue in response to the queue selection instructions.

More explicitly, the loading of control messages in the FIFO queue includes writing messages from the source processor into a memory associated with a FIFO queue in a single write operation. Then, serially supplying loaded control messages to the destination processor includes the destination processor reading the messages from the memory in a single read operation.

Typically, control messages are accepted in a plurality of FIFO queues, where each queue is associated with a unique destination processor. Optionally, the active head and tail areas of the FIFO queue may be stored within a memory that is local to the QM. Backlogged queues requiring more memory storage than provisioned within the internal QM memory may be allocated a buffer selected from a free pool of buffers into which further messages are stored. Pointers are created in the FIFO queues directed to buffers.

In one aspect, available buffers for a particular FIFO queue are selected from the free pool of memory by determining the number of control messages already loaded in that FIFO queue, and assigning available buffers from the free pool of memory to the FIFO queue in response to number of previously loaded control messages. The QM also manages the free pool requests (allocate and deallocate) from external processors or coprocessors.

Additional details of the above-described method and a Queue Manager (QM) system for communicating control messages between processors are provided below.

DETAILED DESCRIPTION

Figure 1:
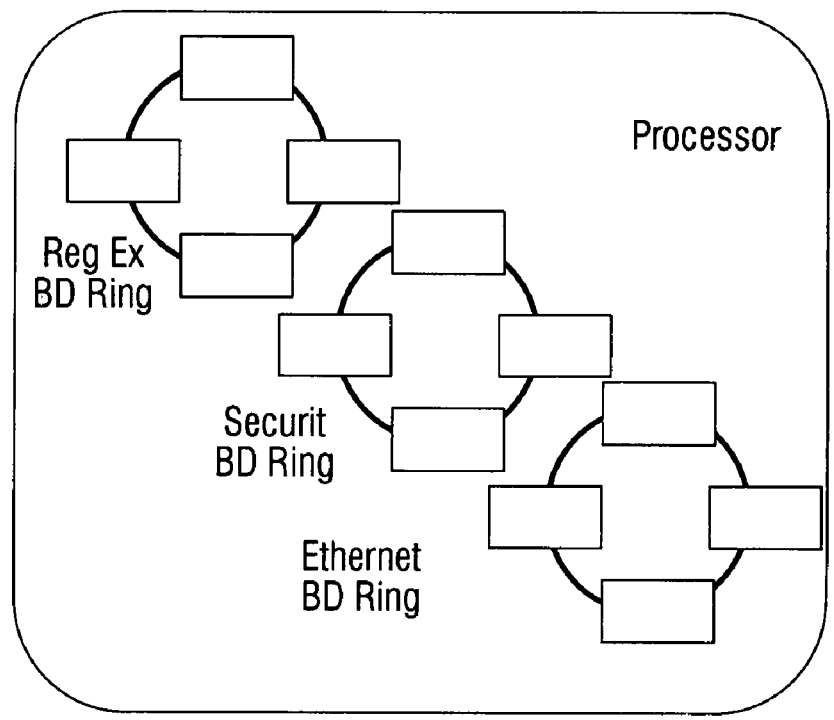
FIG. 1 is a schematic diagram depicting a processor employing buffer descriptor rings (prior art).
Figure 2:
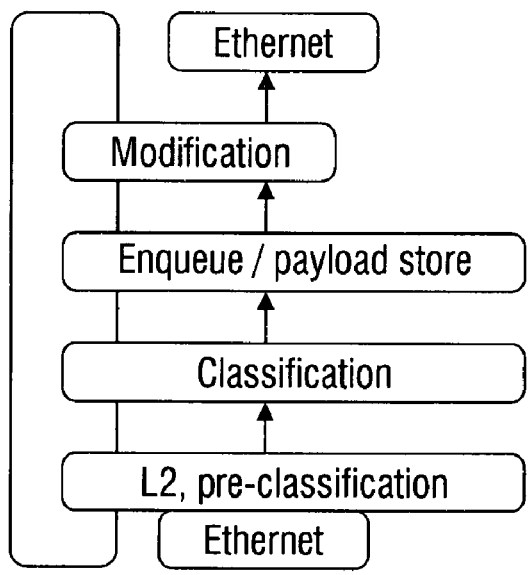
FIG. 2 is a diagram depicting a fixed link communication path with an Ethernet coprocessor (prior art).

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "processor", "processing. device", "component," "module," "system," and the like are intended to refer to a computer-related entity, either hardware, firmware, a combination of hardware and software, software, or software in execution. For example, a component may be, but is not limited to being, a process running on a processor, generation, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Various embodiments will be presented in terms of systems that may include a number of components, modules, and the like. It is to be understood and appreciated that the various systems may include additional components, modules, etc. and/or may not include all of the components, modules etc. discussed in connection with the figures. A combination of these approaches may also be used.

The various illustrative logical blocks, modules, and circuits that have been described may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in the node, or elsewhere. In the alternative, the processor and the storage medium may reside as discrete components in the node, or elsewhere in an access network.

Figure 3:
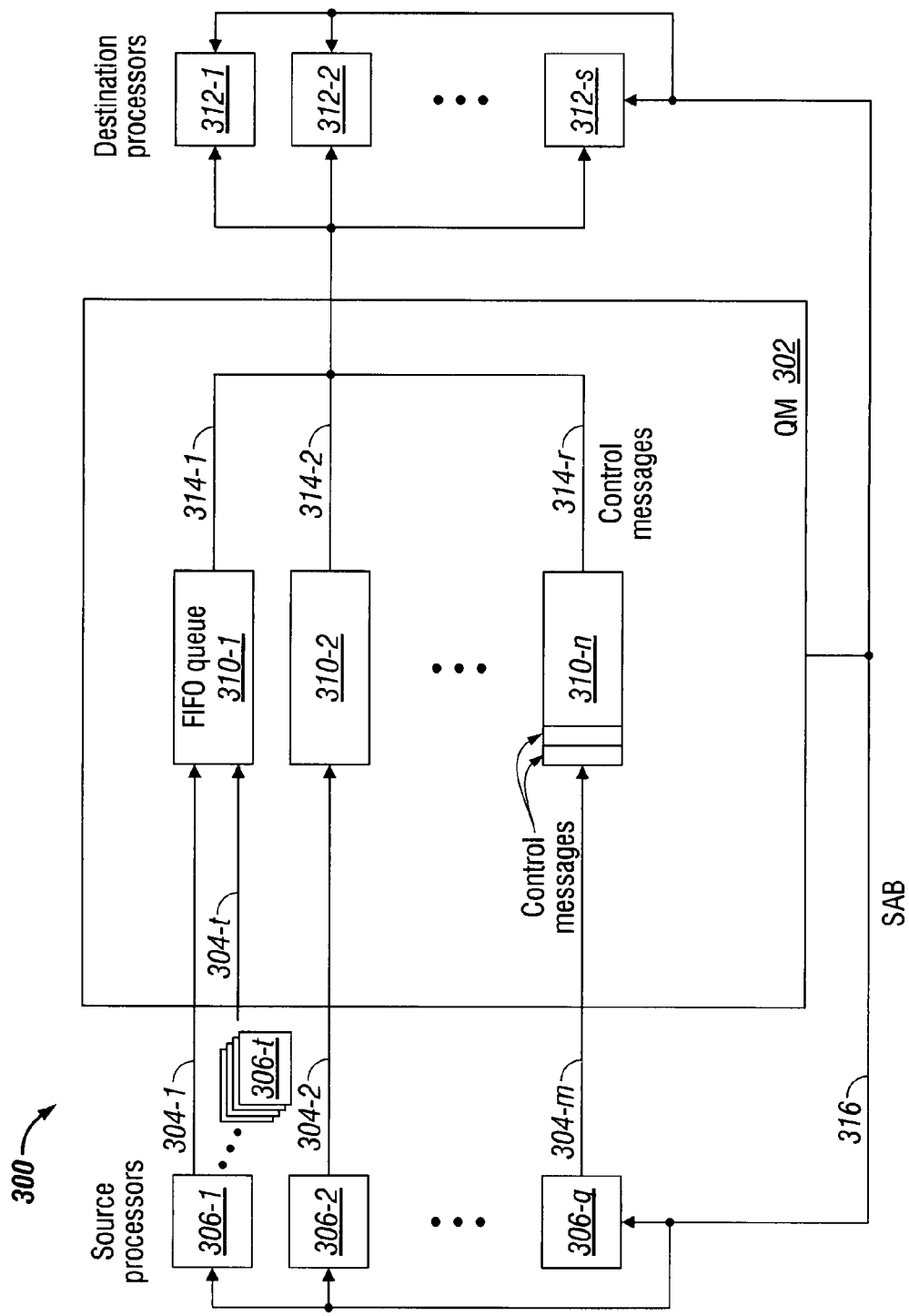
FIG. 3 is a schematic block diagram depicting a Queue Manager (QM) system for communicating control messages between processors.

FIG. 3 is a schematic block diagram depicting a Queue Manager (QM) system for communicating control messages between processors. The system 300 comprises a QM 302 having an input interface on line 304 to accept control messages from a source processor 306 addressed to a destination processor 312. The QM 302 includes a plurality of first-in first-out (FIFO) queues 310. FIFO queues 310-1 through 310-n are shown, however, it should be understood that n is not limited to any particular number. Likewise, input interfaces 304-1 through 304-m are shown connected to source processors 306-1 through 306-q, where m and q are not limited to any particular number.

The QM 302 loads control messages in a FIFO queue associated with a destination processor 312 and serially supplies loaded control messages to the destination processor 312 from the queue at an output interface on line 314. Typically, the QM 302 loads control messages from a source processor in a single write operation, and supplies loaded control messages to the destination processor in a single read operation. Queue output interfaces 314-1 through 314-r are shown, as are destination processors 312-1 through 312-s, where r and s are not limited to any particular number. The source and destination processors may be microprocessors, encryption engines, protocol offload engines, DSPs, logic-coded state machines, or direct memory access (DMA) engines. Some examples of a logic-coded state machine may include an Ethernet sub-system or other IO interface. Further, the logic-coded state machine may also be a baseband processor or codec.

For example, control messages are loaded into FIFO queue 310-1 from source processor 304-1, addressed to destination processor 312-1. In one aspect, QM input interfaces 304-1 through 304-t accept messages from a plurality of source processors (i.e., 306-1 through 306-t) addressed to same destination processor, destination processor 312-1. The QM adds messages to FIFO queue 310-1 in the order in which the control messages are received. In this example t=2, but t is not limited to any particular value. It should be appreciated that the use of a FIFO queue to organize control messages provides a simplified organization means.

Some examples of control messages include instructions to the destination processor from the source processor, a pointer to a data unit, packet metadata, a state of a processor, or a record of processing by a processor. In one aspect, the QM 302 accepts control messages from a source processor without handshaking and supplies loaded control messages to the destination processor without handshaking.

In one aspect, the QM includes a state advertisement bus (SAB) interface connected to the source and destination processors on line 316 for advertising queue-related events. Some possible queue-related events include FIFO queue status, change in FIFO queue status, a FIFO queue having a number of control messages above a threshold, a FIFO queue having a number of control messages below a threshold, and associated free pool memory status. For example, the QM 302 may advertise information that enables processors to determine FIFO queue status.

Figure 4:
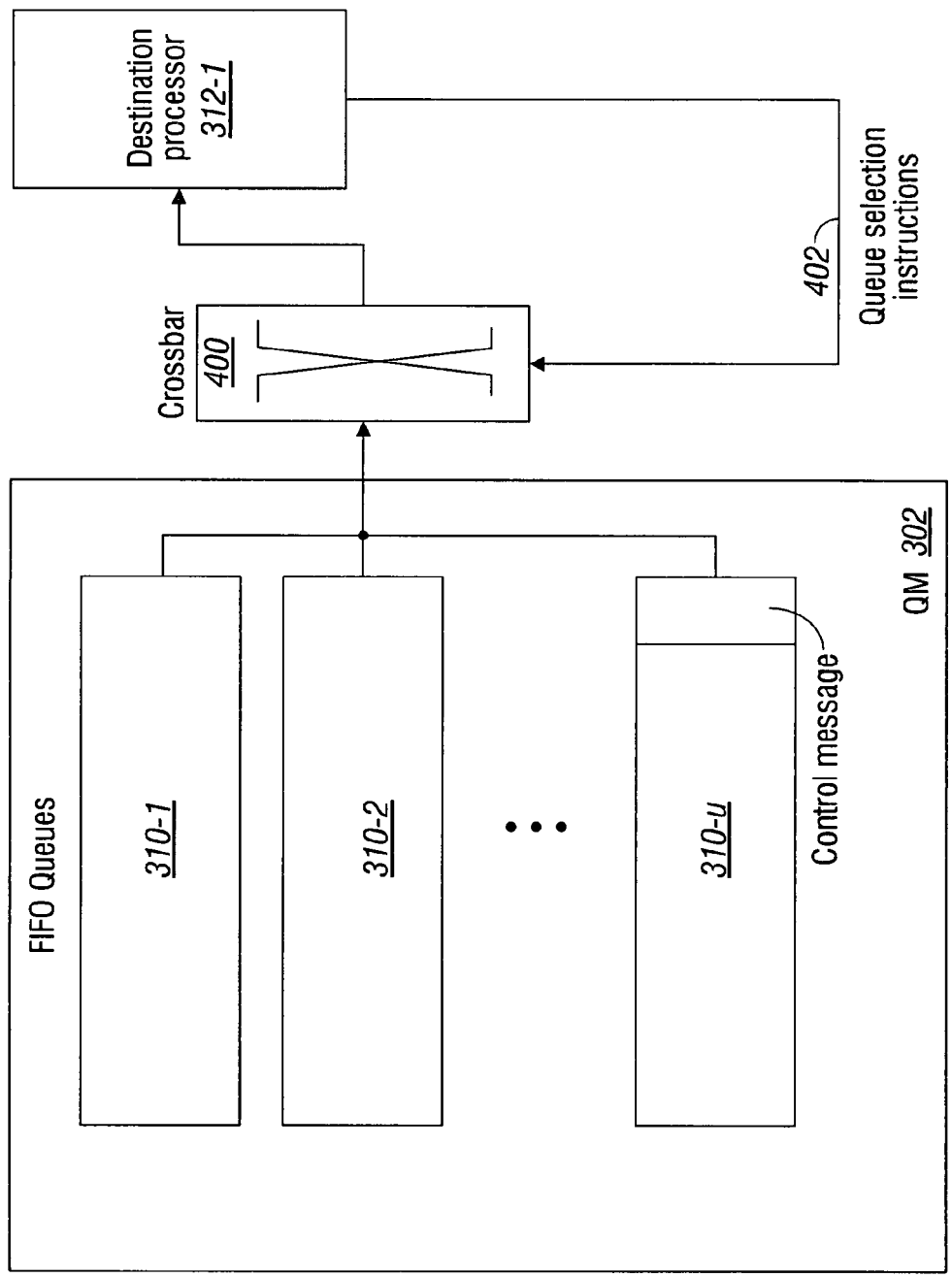
FIG. 4 is a schematic block diagram depicting a first variation of the QM system of FIG. 1.

FIG. 4 is a schematic block diagram depicting a first variation of the QM system of FIG. 1. In this aspect, the QM 302 includes a plurality of parallel FIFO queues associated with the same destination processor. Shown are FIFO queues 310-1 through 310-u, which are all associated with the same destination processor 312-1. The QM supplies control messages from the parallel FIFO queues 310-1 through 310-u in an order responsive to criteria such as queue ranking, weighting, and shaping. In one aspect, the QM 302 receives instructions from an external entity for directing control messages into particular queues. In another aspect not shown, the QM employs a controller for determining how the control messages are routed to the FIFO queues. In another aspect, each FIFO queue is associated with a particular source processor.

As shown, the crossbar 400 receives queue selection instructions from destination processor 312-1 on line 402, and supplies control messages from a FIFO queue selected in response to the queue selection instructions.

Figure 5:
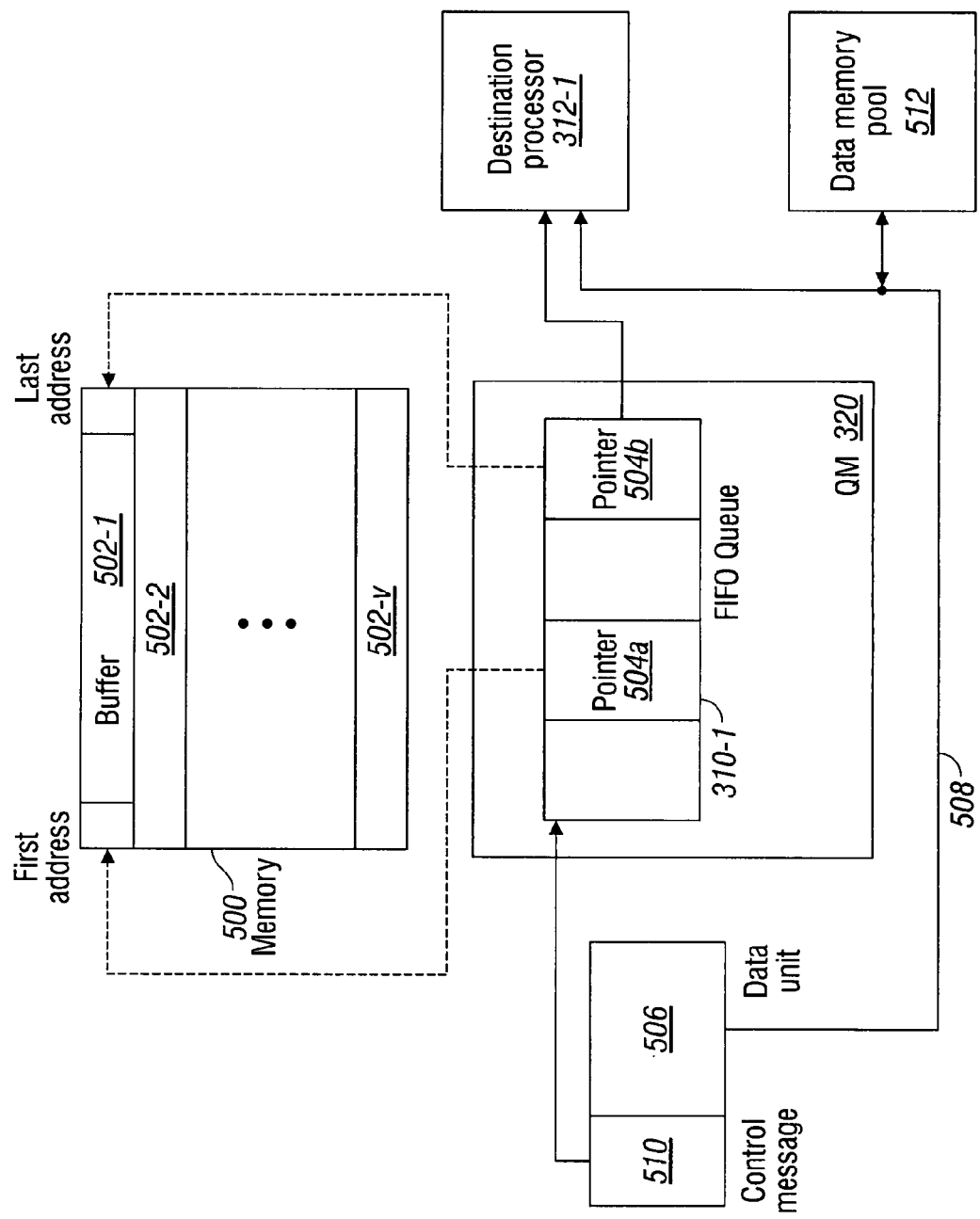
FIG. 5 is a schematic block diagram depicting a second variation of the QM system of FIG. 1.

FIG. 5 is a schematic block diagram depicting a second variation of the QM system of FIG. 1. In this aspect, the system 300 further comprises a free pool of memory 500 including available buffers 502 having locations in a memory. That is, the free pool of memory 500 may be part of a larger memory (not shown). The buffers are represented by reference designators 502-1 through 502-v. The memory may be embedded on the same physical device as the QM 302. Alternately but not shown, the memory may be internal to the QM itself. As noted above, the QM 302 accepts control messages in a plurality of FIFO queues 310, where FIFO queues are associated with a unique destination processor. More explicitly, the QM 302 loads control messages by storing (writing) the control messages in available buffers 502 selected from the free pool of memory 500, and creating pointers 504 in the FIFO queues directed to the buffers. Buffers 502-1 through 502-v are shown, where v is not limited to any particular number. The pointers 504 contain buffer addresses, or instructions for obtaining buffer addresses. As shown, pointers 504a is directed to the first address in buffers 502-1 and pointer 504b is directed to the last address in buffer 502-1.

In one aspect, the QM 302 counts the number of control messages loaded in a particular FIFO queue and assigns available buffers from the free pool of memory to that FIFO queue in response to number of previously loaded control messages. For example, if the buffers vary in the amount of data stored, the QM may use the pointers to determine the amount of memory already allocated as a means of assigning available buffers. Alternately, a source or destination processor may decide to drop control messages as a result of monitoring queue information on the SAB.

In another aspect, the QM 302, prior to loading a control message in a FIFO queue, determines the number of loaded control messages in the FIFO queue, compares the number of loaded control messages to a criteria such as a control message limit value or the number of available memory locations in the free pool of memory, and decides not to load the control message in response to comparing.

In another aspect, the QM 302 may accept a data unit associated with a control message directed to FIFO queue 310-1. The data unit 506 may be in route to destination processor 312-1 via data bus 508, for example. The data unit may be a packet of information to be managed or manipulated by destination processor 312-1, while a control message 510 may include instructions for handling data unit 506. The QM may determine the number of data units stored in a data memory pool 512 associated with FIFO queue 310-1, and decide not to load control message 510 in FIFO queue 310-1 if it is determined that the number of data units is approaching the limit of memory locations in the data memory pool 512. This action may also result in the data unit 506 not being loaded into memory pool 512. For example, data unit 506 may be discarded, as might be done with data arriving on the Ethernet interface. Alternately, the data (and control message) may be held until a later time when space is available in the queue, as would be done by the processor core in some situations. As another alternative, a source or destination processor may decide to drop data messages as a result of monitoring the status of memory 512.

Figure 6:
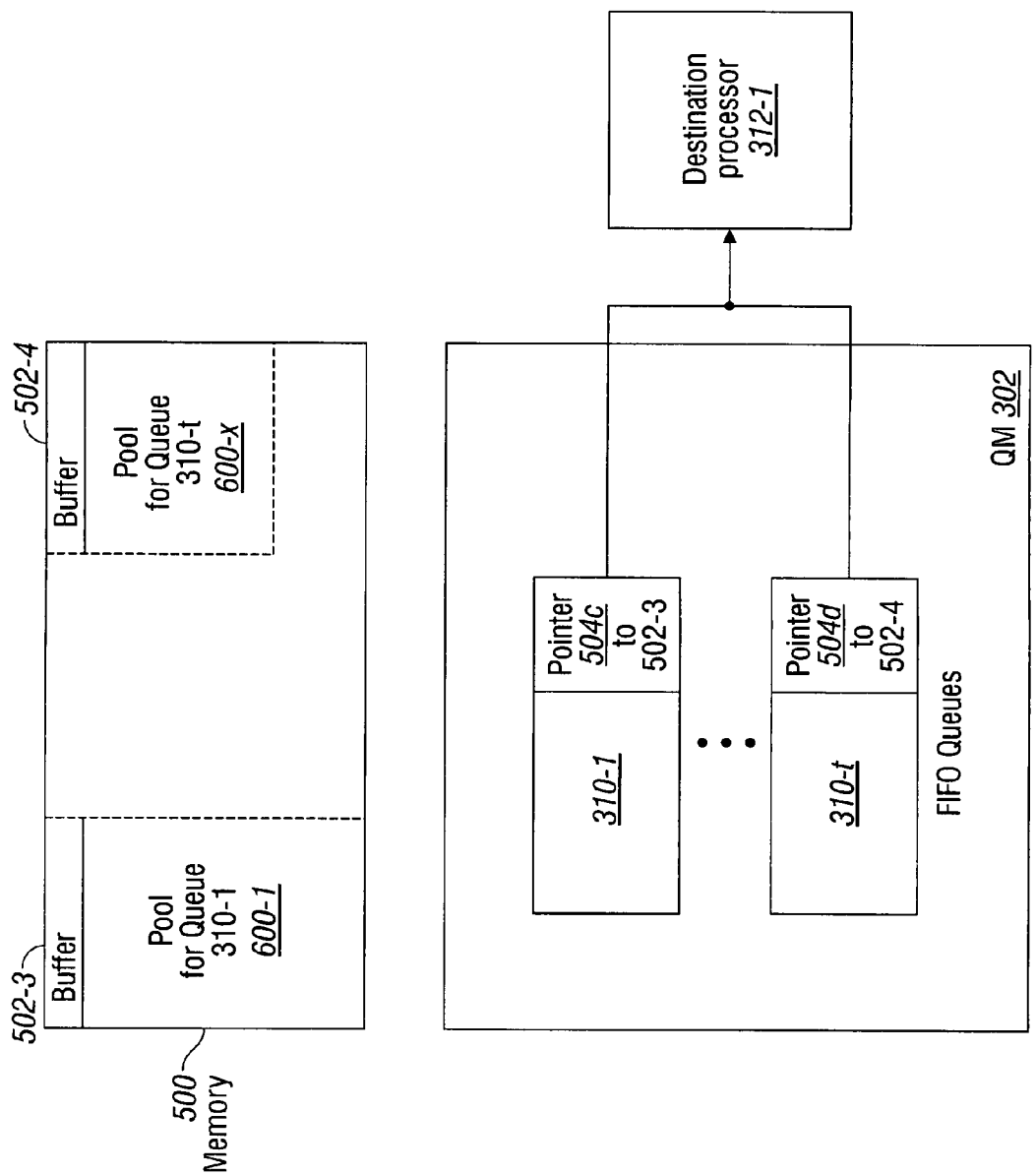
FIG. 6 is a schematic block diagram depicting a third variation of the QM system of FIG. 1.

FIG. 6 is a schematic block diagram depicting a third variation of the QM system of FIG. 1. In this aspect, the QM 302 includes a plurality of parallel FIFO queues 310-1 through 310-t associated with a destination processor 312-1. The FIFO queues are differentiated by queue ranking. The QM 302 selects available buffers 502 from the free pool of memory 500 by establishing a plurality of differently-sized memory. pools and assigning FIFO queues to memory pools in response to the queue differentiation. As shown, the differently-sized memory pools are represented with reference designators 600-1 through 600-x, where x is not limited to any particular value. For example, pool 600-1 is associated with FIFO queue 310-1 and pool 600-x with FIFO queue 310-t. As in FIG. 5, the FIFO queues include pointers directed to buffers in the designated free pool areas. For example, pointer 504-c in FIFO queue 310-1 is directed to buffer 502-3 in free pool 600-1, while pointer 504-d is directed to buffer 502-4 in free pool 600-x.

Although system 300 has been depicted as blocks of hardware, it should be realized that portions of the system may be embodied as processor instructors stored in memory that are executed by a processor or logic machine capable of operating on processor instruction code. Although the QM may be used to enable communications with processors embedded in an SoC, in other aspects, some or all the processes may be external to the device in which the QM is embedded.

Functional Description

The above-described Queue Manager is a centralized communication manager that utilizes hardware-managed queues through which messages to destination processors/coprocessors are passed. The QM maintains coherency and synchronization between multiple sources, and between source and destination accesses to the work queues. The QM provides a single shot access mechanism to source (enqueue) and destination (dequeue), which minimizes processor involvement. Strict message ordering is maintained without the requirement of queue communication channels or handshaking mechanisms.

The QM utilizes a one-to-one and/or a many-to-one queue assignment to simplify the message selection. Parallel class-based queues are supported between endpoints to enable differentiated access channels between processors and coprocessors. Message storage space is allocated by the QM on demand from centralized free pools. Multiple free pools are supported to allow under and over-subscribed domains.

The QM monitors and advertises the queue and free pool utilization, providing a central location for interrogation of SoC congestion. The QM manages the centralized free pools supporting atomic accesses from multiple sources for the allocation and deallocation of resources. A simple, single shot read or write command is provided for processors/coprocessors to obtain or release resources, respectively.

Interested masters (processors) can then monitor the resources in which they are interested (e.g., free pools or work queues) through address filtering off the broadcast bus (SAB). Fill level awareness is an aspect of congestion awareness within the SoC. Any processor can listen to any congestion point within the SoC, regardless of the immediate connections to the processor. Fill level awareness may also be related to work queue availability. Using the QM system, there is no need for (co)processors to poll or be interrupted when new items are loading to its work pending structure (queue).

Figure 7:
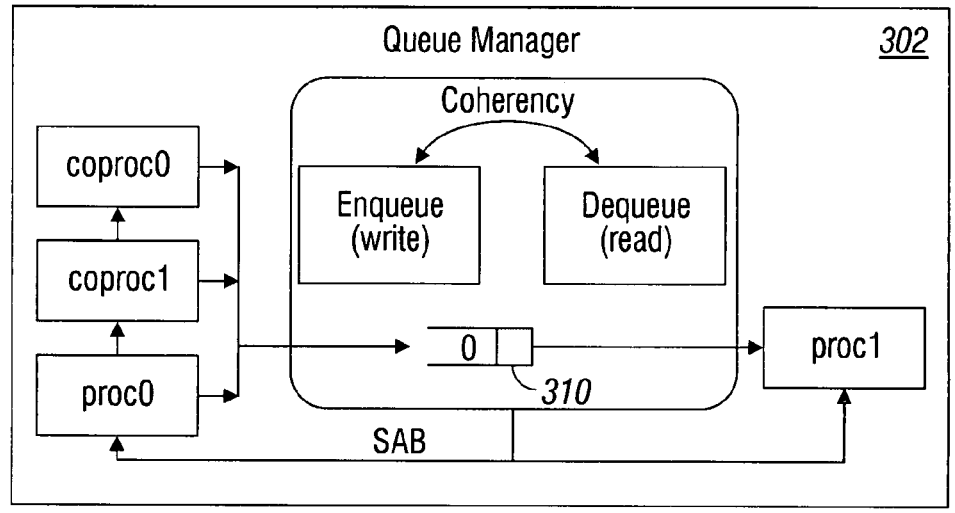
FIG. 7 is a schematic block diagram depicting a coherency aspect of the system of FIG. 1.

FIG. 7 is a schematic block diagram depicting a coherency aspect of the system of FIG. 1. The queuing subsystem allows efficient passing of high-speed messages. The QM 302 manages work queues for each processor (proc) or coprocessor (coproc). Coherency and synchronization are managed between multiple sources (enqueue and dequeue). The FIFO queue 310 inherently maintains message ordering within a given queue, supporting one-to-one and many-to-one queue assignments. The queue depths are expandable using associated DRAM. Standard API (Native Mode) can be used to pass messages. To enqueue, a single shot write loads a message on to a queue. To dequeue, a single shot read retrieves a message from a queue. Queue and free pools state change (fill level) may be continually broadcast on the State Advertisement Bus (SAB).

Figure 8:
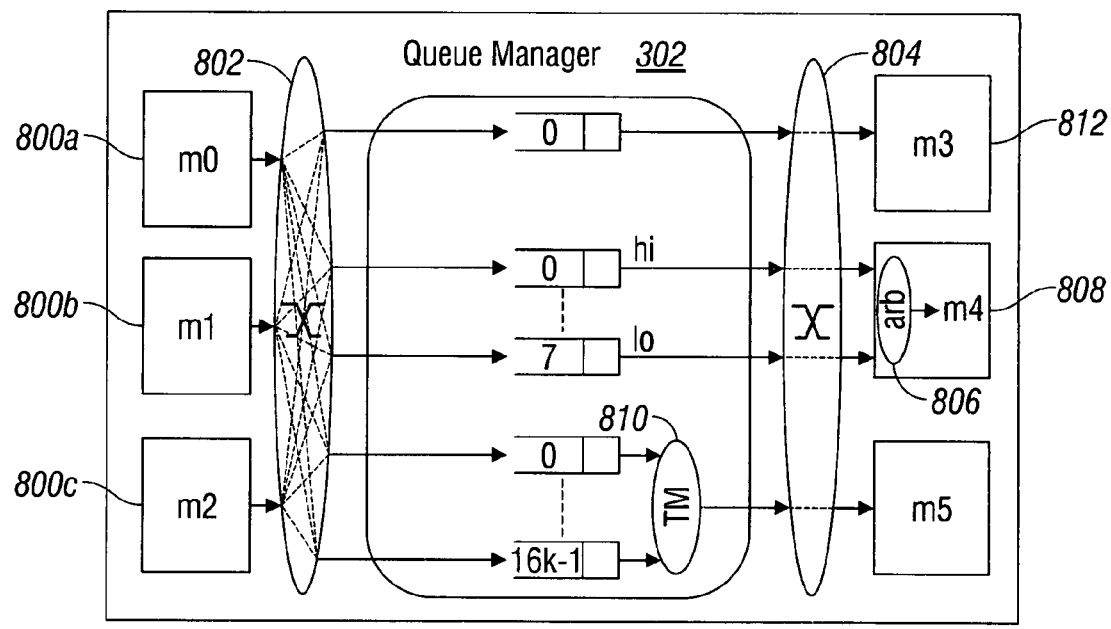
FIG. 8 is a schematic block diagram highlighting the aspect of parallel paths through the QM.

FIG. 8 is a schematic block diagram highlighting the aspect of parallel paths through the QM. Queue assignments may be made to supports parallel paths to (co)processors. For example, class based arbiters may be used for queue selection (next work load). As shown, processor m0 800a, m1 800b, and m2 800c are connected through crossbar 802 to FIFO queues 0 through 7, where queue 0 has the highest priority. The queues are connected to output crossbar switch 804, which is connected to arbiter (arb) 806. (m)4 (808) issues a request to arbiter 806, which uses crossbar 804 to select a queue (from 0 through 7). The address for this queue is included within the read request to the QM, which supplies the head message from the selected queue within the read response. The QM does not select a queue for processor m3 (812), for processor m4 (806), or select a queue within the traffic manager TM 810. In each case the proc/coproc issues a request to one logical queue. For an aggregate of queues, the arbiter, if present, selects the physical queue to read within the aggregate based upon factors such as queue ranking or shaping. Note: although crossbars 802 and 802 are depicted as separate elements, in some aspects they are only logically separate (but physically the same). The TM 810 may be used to maintain queue depth meters: both instantaneous and average fill levels. A number of TM scheduling algorithms may be implemented, which would be known by those with skill in the art.

Figure 9:
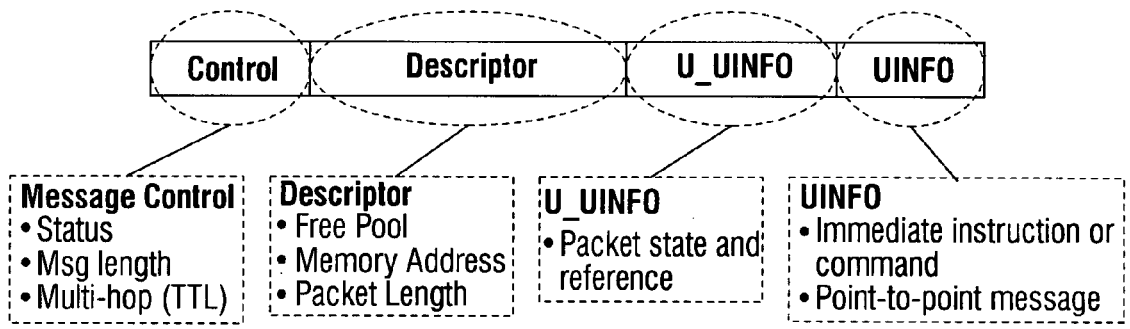
FIG. 9 is a diagram depicting an exemplary Native Mode message format that may be used in QM communications.

FIG. 9 is a diagram depicting an exemplary Native Mode message format that may be used in QM communications. An exemplary message may include packet metadata in the descriptor 900. Typically, the metadata is a pointer to a packet that is stored somewhere in memory. However, it may also be a pointer to context data (e.g., for a flow or connection). The U_UINFO segment 902 contains associated state information, such as end-to-end associated data. This segment is used to preserves state or classification results (e.g., flow ID or program counter). The UNIFO segment 904 includes immediate data (instruction or command), such as a hop-to-hop command between sub-systems (e.g., DMA). The segment contents are defined by Native Mode components including DMA operations such as copy, or Sec operations such as pointer-to-token. The Native Mode payload format may be used to define how a packet is stored in memory. Embedded pointers may be used to create a linked list of buffers. Header Extension Buffers (HEBs) may define space for (limited) packet header modifications. HEBs can be used for user-defined information stored with packet (e.g., timestamp).

Figure 10A:
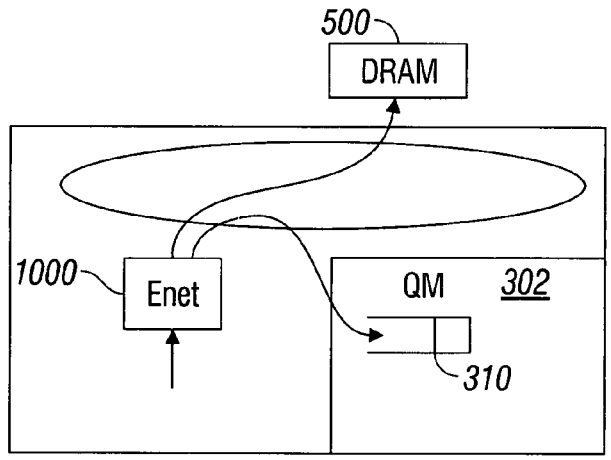
FIGS. 10A and 10B are schematic block diagrams depicting an exemplary QM process for managing payload and control message data.
Figure 10B:
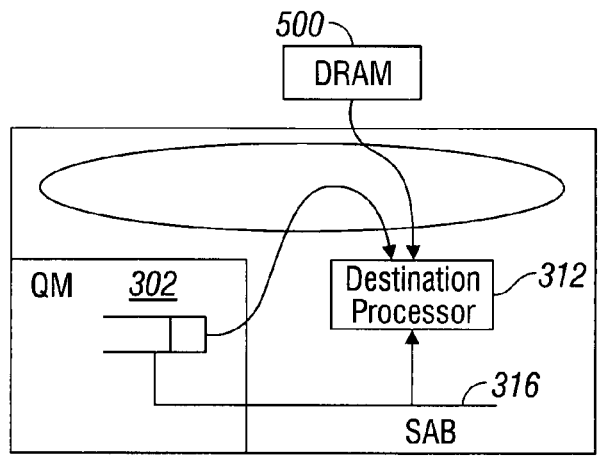

FIGS. 10A and 10B are schematic block diagrams depicting an exemplary QM process for managing payload and control message data. In FIG. 10A, a packet is received from Ethernet processor (Enet) 1000. The arriving packet is split into payload and a control message. The payload is written to DRAM 500, for example, using a Native Mode packet format. The control message is written into a queue 310 in the QM 302 for a destination processor. Again, the communication may be made using the Native Mode message format. If the control message descriptor (see FIG. 9) field has a global address, data copies can be avoided when transferring the packet between sub-systems (processors).

Since the control message format is in a universal format, the receiving processor 312 does not need to re-format or translate message. In FIG. 10B, the destination processor 312 is notified of a queue state change (empty to not empty) through the State Advertisement Bus (SAB). The destination processor 312 reads the control message from the FIFO queue 310. Then, the destination processor 312 reads in the payload information referenced by descriptor in the control message, if necessary.

Figure 11:
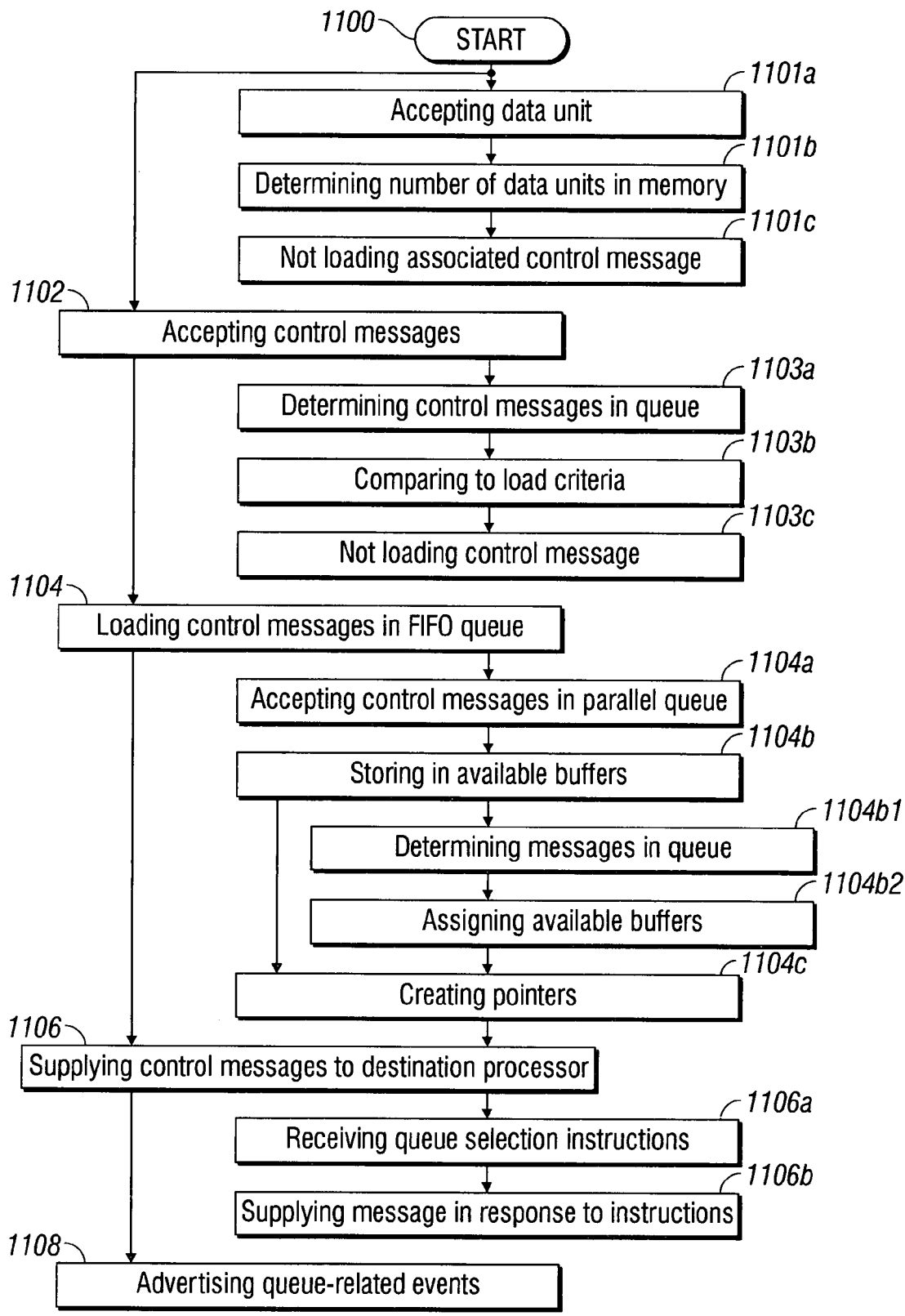
FIG. 11 is a flowchart illustrating a method for communicating control messages between processors.

FIG. 11 is a flowchart illustrating a method for communicating control messages between processors. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 1100.

Step 1102 accepts control messages from a source processor addressed to a destination processor. As noted above, this step is typically subsequent to the separation of the control messages from an associated payload. The control message may be instructions to a destination processor from the source processor, a pointer to a data unit, packet metadata, a state of a processor, or a record of processing by a processor. Step 1104 loads the control messages in a FIFO queue associated with the destination processor. Step 1106 serially supplies loaded control messages to the destination processor from the queue.

Typically, Step 1104 writes a control messages from the source processor into a memory associated with a FIFO queue in a single write operation. Likewise, in Step 1106 the destination processor reads the control message from the memory in a single read operation. In one aspect, Step 1102 accepts control messages from the source processor without handshaking, and Step 1106 supplies control messages to the destination processor without handshaking.

In one aspect, Step 1102 accepts control messages from a plurality of source processors, and Step 1104 adds messages to the queue in the order in which they are received. In another aspect, Step 1104 loads control messages into a plurality of parallel FIFO queues associated with the same destination processor. Then, Step 1106 supplies control messages from the parallel FIFO queues in an order responsive to criteria selected such as ranking, weighting, and shaping. Alternately, the control messages may be supplied in accordance with the following substeps. Step 1106*a* receives queue selection instructions from the destination processor, and Step 1106*b* supplies control messages from a selected FIFO queue in response to the queue selection instructions.

In one aspect, loading the control messages in the FIFO queue includes substeps. Step 1104*a* accepts control messages in a plurality of FIFO queues, each queue associated with a destination processor. Step 1104*b* stores the control messages in available buffers, selected from a free pool of memory. Step 1104*c* creates pointers in the FIFO queues directed to buffers. In another aspect, selecting available buffers from the free pool of memory (Step 1104*b*) includes additional substeps. Step 1104*b*1 determines the number of control messages loaded in a first FIFO queue. Step 1104*b*2 assigns available buffers from the free pool of memory to the first FIFO queue in response to number of previously loaded control messages.

In one variation, Step 1103*a* may determine the number of loaded control messages in the FIFO queue prior to loading the control message in the FIFO queue (Step 1104). Step 1103*b* compares the number of loaded control words to criteria such as a control message limit value or the number of available memory locations in the free pool of memory. Then, Step 1103*c* decides not to load the control message in response to the comparison.

In one aspect, Step 1101*a* accepts a first data unit associated with a first control message directed to the first FIFO queue. Step 1101*b* determines the number of data units stored in a data memory pool associated with the first FIFO queue. Step 1101*c* decides not to load the first control message in the first FIFO queue, in response to determining that the number of data units is approaching the limit of memory locations in the data memory pool.

In another aspect, Step 1104 loads control messages into a plurality of parallel FIFO queues associated with a first destination processor, and differentiated by queue ranking. Selecting available buffers from the free pool of memory (Step 1104*b*) further includes assigning FIFO queues to differently-sized memory pools in response to the queue differentiation.

In one aspect, Step 1108 advertises queue-related events on a state advertisement bus (SAB) connected to the source and destination processors. Some examples of queue-related events include FIFO queue status, a change in FIFO queue status, a FIFO queue having a number of control messages above a threshold, a FIFO queue having a number of control messages below a threshold, and associated free pool memory status.

A Queue Manager (QM) system and method have been provided for communicating control messages between processors. Examples of specific messaging formats and hardware structures have been given to illustrate the invention. But the invention is not limited to just these examples. Other variations and embodiments of the invention will occur to those skilled in the art.

We claim:

1. A method for communicating control messages between processors, the method comprising:
   accepting control messages from a source processor addressed to a plurality of destination processors, where a control message is defined as a message selected from a group consisting of a processor instruction, a pointer to a data file, packet metadata, a processor state, and a record of processing;
   loading the control messages in a plurality of first-in first-out (FIFO) queues, each FIFO queue associated with a corresponding destination processor, as follows:
      storing the control messages in available buffers, selected from a free pool of memory by:
         determining the number of control messages associated with each FIFO queue; and,
         assigning available buffers from the free pool of memory to each FIFO queue in response to the number of previously loaded control messages;
      creating pointers in the FIFO queues directed to buffers; and,
   supplying loaded control messages to the destination processors from the buffers in response to reading corresponding pointers from the FIFO queues.

2. The method of claim 1 wherein accepting control messages from the source processor includes accepting control messages from a plurality of source processors; and,
   wherein creating pointers in the FIFO queues includes adding pointers to the FIFO queues in the order in which the corresponding control messages are received.

3. The method of claim 1 wherein creating pointers in the FIFO queues includes creating pointers in a plurality of parallel FIFO queues associated with the same destination processor; and,
   wherein supplying loaded control messages to the destination processors includes reading pointers from the parallel FIFO queues in an order responsive to criteria selected from a group consisting of queue ranking, weighting, and shaping.

4. The method of claim 1 wherein loading the control messages includes creating pointers in a plurality of parallel FIFO queues associated with the same destination processor; and,
   wherein supplying loaded control messages to the destination processors includes;
      receiving queue selection instructions from the destination processor; and,
      reading pointers from a selected FIFO queue in response to the queue selection instructions.

5. The method of claim 1 wherein storing the control messages in the available buffers includes writing a control message from the source processor into a buffer memory associated with a FIFO queue in a single write operation; and,
   wherein serially supplying loaded control messages to the destination processor includes the destination processor reading the control message from the buffer memory in a single read operation.

6. The method of claim 1 further comprising:
   prior to creating a pointer in a FIFO queue, determining the number of loaded pointers in the FIFO queue;
   comparing the number of pointers to criteria selected from group consisting of a control message limit value and a number of available memory locations in the free pool of memory; and,
   deciding not to store a control message in a corresponding buffer in response to the comparing.

7. The method of claim 6 further comprising:
   accepting a first data unit associated with a first control message directed to the first FIFO queue;
   determining the number of data units stored in a data memory pool associated with the first FIFO queue; and, deciding not to store the first control message in the buffer associated with the first FIFO queue, in response to determining that the number of data units is approaching the limit of memory locations in the data memory pool.

8. The method of claim 1 wherein loading the control messages in the plurality of FIFO queues includes creating pointers in a plurality of parallel FIFO queues, associated with a first destination processor, and differentiated by queue ranking; and, wherein selecting available buffers from the free pool of memory further includes assigning FIFO queues to differently-sized memory pools in response to the queue differentiation.

9. The method of claim 1 further comprising:
advertising queue-related events on a state advertisement bus (SAB) connected to the source and destination processors, the queue related events selected from a group consisting of a FIFO queue status from the plurality of FIFO queues, change in a FIFO queue status from the plurality of FIFO queues, a FIFO queue from the plurality of FIFO queues having a number of control messages above a threshold, a FIFO queue from the plurality of FIFO queues having a number of control messages below a threshold, and associated free pool memory status.

10. The method of claim 1 wherein accepting control messages from a source processor includes accepting control messages without handshaking; and, wherein supplying loaded control messages to the destination processor includes supplying control messages without handshaking.

11. A Queue Manager (QM) system for communicating' control messages between processors, the system comprising:

a free pool of memory including available buffers having locations in a memory; and, a QM having' an input: interface to accept control messages from a source processor addressed to a plurality of destination processors, where a control message is defined as a message selected from a group consisting of a processor instruction, a pointer to a data file, packet metadata, a processor state and a record of processing , and a plurality of first-in first-out (FIFO) queues, each associated with a corresponding' destination processor, the QM loading control messages in a FIFO queue associated with a destination processor by counting' the number of control messages loaded in the FIFO queues, assigning available buffers from the free pool of memory to FIFO queues in response to the number of previously loaded control messages, storing the control messages in available buffers selected from the free pool of memory, and creating' pointers in the FIFO queues directed to the buffers, and the QM supplying loaded control messages to the destination processor from the buffers at: an output: interface in response to reading corresponding pointers from the FIFO queues.

12. The system of claim 11 wherein the QM input interface accepts messages from a plurality of source processors addressed to the destination processors, and adds pointers to each FIFO queue in the order in which the control messages are received.

13. The system of claim 11 wherein the QM includes a plurality of parallel FIFO queues associated with the same destination processor, and wherein the QM reads pointers from the parallel FIFO queues in an order responsive to criteria selected from a group consisting of queue ranking, weighting, and shaping.

14. The system of claim 11 wherein the QM includes a plurality of parallel FIFO queues associated with the same destination processor, and wherein the QM receives queue selection instructions from the destination processors and reads pointers from corresponding FIFO queues selected in response to the queue selection instructions.

15. The system of claim 11 wherein the QM loads each control message from a source processor in a single write operation, and supplies each loaded control message to a corresponding destination processor in a single read operation.

16. The system of claim 11 wherein the QM, prior to creating a pointer in a FIFO queue, determines the number of pointers in the FIFO queue, compares the number of pointers to a criteria selected from a group consisting of a control message limit value and a number of available memory locations in the free pool of memory, arid decides riot to store a control message in a corresponding buffer in response to comparing.

17. The system of claim 16 wherein the QM accepts a first data unit associated with a first control message directed to a first FIFO queue, determines the number of data units stored in a data memory pool associated with the first FIFO queue, and decides not to store the first control message in a buffer associated with first FIFO queue in response to determining that the number of data units is approaching the limit of memory locations in the data memory pool.

18. The system of claim 11 wherein the QM includes a plurality of parallel FIFO queues associated with a first destination processor, differentiated by queue ranking; and selects available buffers from the free pool of memory by establishing' a plurality of differently-sized memory pools and assigning FIFO queues to memory pools in response to the queue differentiation.

19. The system of claim 11 wherein the QM includes a state advertisement bus (SAB) interface connected to the source and destination processors for advertising queue-related events selected from a group consisting of a FIFO queue status from the plurality of FIFO queues, a change in FIFO queue status from the plurality of FIFO queues, a FIFO queue from the plurality of FIFO queues having a number of control messages above a threshold, a FIFO queue from the plurality of FIFO queues having a number of control messages below a threshold, and associated free pool memory status.

20. The system of claim 11 wherein the QM accepts control messages from the source processor selected from a group consisting of instructions to the destination processor from the source processor, a pointer to a data unit a packet metadata, a state of a processor, and a record of processing by an processor.

* * * * *